United States Patent Office 3,319,393
Patented May 16, 1967

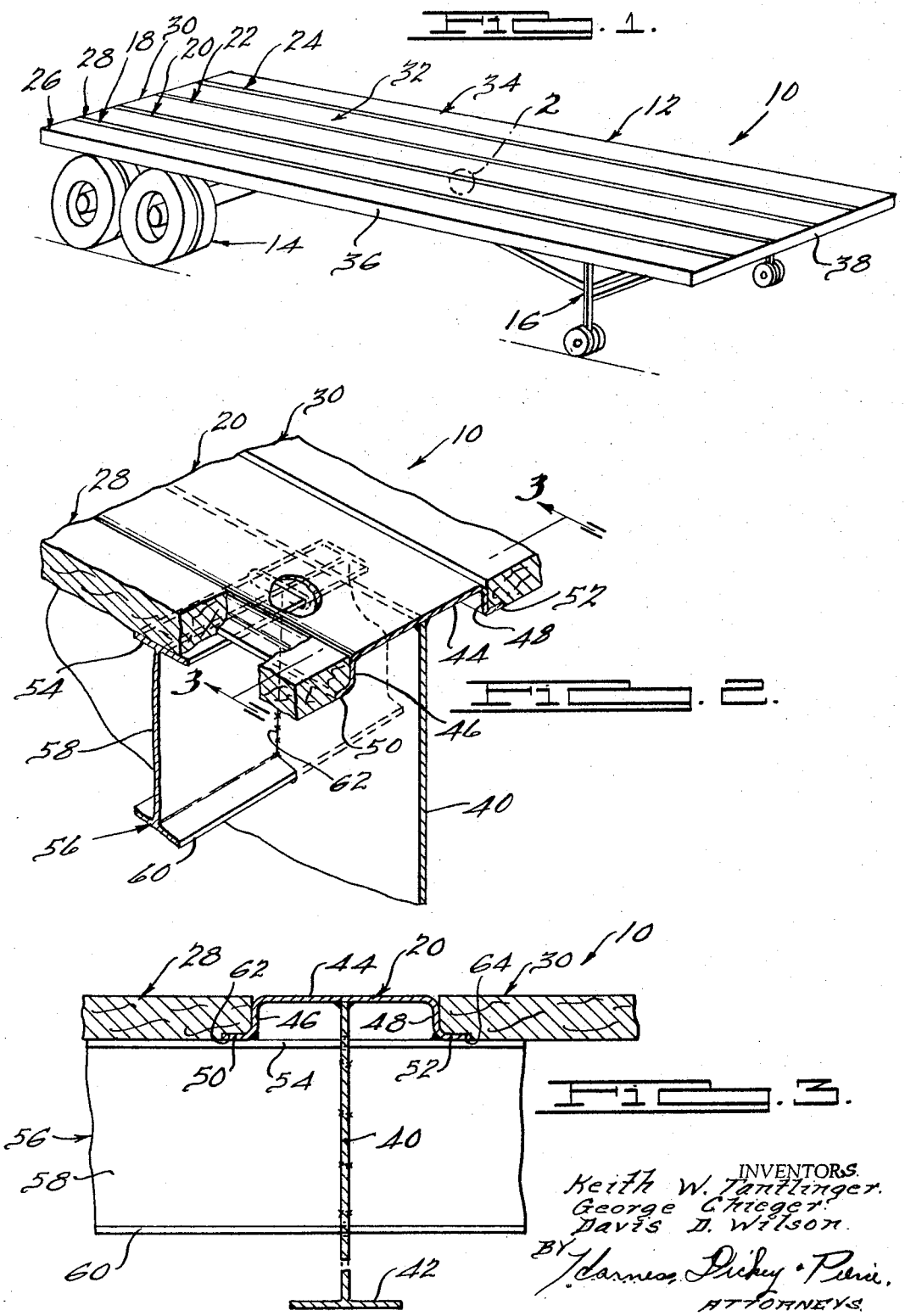

3,319,393
FLAT BED TRAILER CONSTRUCTION
Keith W. Tantlinger, Grosse Pointe Shores, Mich., Davis
D. Wilson, Fort Worth, Tex., and George Chieger,
Birmingham, Mich., assignors to Fruehauf Corporation,
Detroit, Mich., a corporation of Michigan
Filed Jan. 6, 1964, Ser. No. 335,922
1 Claim. (Cl. 52—496)

This invention relates generally to flat bed trailers, and more particularly to an improved configuration for the longitudinal frame members and floor boards of a flat bed trailer.

Heavy duty flat bed trailers are often used to carry a number of diverse products, for example, relatively long steel beams or, when provided with side walls or a hopper, comminuted materials, for example, grain. Thus, the floor construction of such vehicles must be capable of withstanding relatively heavy loads and also relatively tight to prevent the loss of comminuted materials.

Flat bed trailer floor constructions heretofore known and used generally comprise a plurality of longitudinal beams having lateral beams spaced downwardly from the upper flanges thereof a distance equal to the thickness of the floor boards. The floor boards are generally relieved along an upper edge portion thereof so as to slide under the flanges of the longitudinal beams. Thus, the outer edges of the flanges on the longitudinally extending beams are not supported directly by the cross members. When a heavy concentrated load is placed on an outer edge of a flange, the flange may bend or twist downwardly. Such tilting or bending obviously ultimately leads to structural failure and leakage. Furthermore, removal and replacement of the floor boards is relatively difficult. Also, on grain trailers where the boards are not supported along the edges thereof, leakage of grain occurs due to the downward sagging or warping of the boards.

The foregoing problems are solved, in accordance with an exemplary constructed embodiment of the instant invention, by the utilization of longitudinal beams having hat section top flanges. The longitudinal edges of the top flange underlie adjacent floor boards but engage and directly overlie the transverse cross members. Therefore, concentrated loads on the longitudinal members do not effect a tilting of the upper flange of the longitudinal beams.

Another advantage of the instant construction is that the dado surface of the lumber faces downwardly so that flooring can be readily attached to and detached from the longitudinal beams and transverse cross members. Furthermore, the brim of the hat section supports the floor lumber so that heavy loads are carried with the assistance of the longitudinal beams.

Other objects and advantages of the instant invention will be apparent in the following specification, claim and drawings, wherein:

FIGURE 1 is a perspective view of a heavy duty flat bed trailer having the floor construction of the instant invention;

FIG. 2 is an enlarged fragmentary view taken within the circle 2 of FIGURE 1, and;

FIG. 3 is a cross sectional view taken substantially along the line 3—3 of FIGURE 2.

As seen in FIGURE 1 of the drawing, a floor construction 10 in accordance with the instant invention is shown in operative association with a flat bed trailer 12. The trailer 12 has a conventional wheel suspension 14 and landing gear 16.

The floor construction 10 comprises a plurality of longitudinally extending floor beams 18, 20, 22 and 24 having floor boards 26, 28, 30, 32 and 34 at the edges thereof, respectively. The beams 18, 20, 22 and 24 are fabricated from steel and the floor boards are, for example, oak planks. Suitable longitudinal edge rails, one of which is shown and designated by the numeral 36, are provided along with front and rear rails, the front rail being shown and designated by the numeral 38.

The beams 18, 20, 22 and 24 are of like construction. Therefore, only the beam 20 and its adjacent floor boards 28 and 30 will be described herein for the purpose of clarity.

As best seen in FIGURES 2 and 3 of the drawings, the longitudinal beam 20 comprises a vertical web portion 40, a lower flange 42 and an upper flange 44. In accordance with the instant invention, the upper flange 44 has opposite downwardly folded portions 46 and 48 with generally horizontal terminal edge portions 50 and 52, respectively. The edge portions 50 and 52 are seated upon an upper flange portion 54 on a cross member 56.

The cross member 56 has a web portion 58 and a lower flange 60 similar to the flange 54. The cross member 56 extends through a complementary aperture 62 in the web portion 40 of the beam 20 and is secured thereto as by welding.

The floor boards 28 and 30 have relieved portions 62 and 64, respectively, for clearance of the edge portions 50 and 52 on the flange 44 of the beam 20. Thus, it should be apparent that loads on the floor boards are transferred through the edge portion of the longitudinal beams to the cross members, the top flanges of the longitudinal beams being relieved of cantilevered loads. Furthermore, the floor boards are relatively easily removed and replaced because they overlie the edge portions of the longitudinal beams.

It is to be understood that the specific construction of the improved trailer construction herein disclosed and described are presented for the purpose of explanation and illustration and are not intended to indicate the limits of the invention, the scope of which is defined by the following claim.

What is claimed is:

A floor construction for heavy duty over-the-road vehicles comprising:
 a longitudinal frame member of generally I-shaped transverse cross section defined by a pair of vertically spaced flanges having a vertical web portion therebetween, the top flange of said frame member being of hat-shaped transverse cross section defined by a horizontal center portion having downwardly extending portions on opposite sides thereof with oppositely directed horizontal edge portions, respectively, the vertical web portion of said longitudinal frame member having an I-shaped aperture therein,
 a cross member of generally I-shaped cross section defined by a vertical web portion and horizontal flanges extending through the I-shaped aperture in the web portion of said longitudinal frame member and immediately underlying the horizontal edge portions thereof, said cross member being welded to said I-shaped aperture whereby the web portions of said frame and cross members mutually support one another, and
 a pair of floor boards seated on said cross member and on the edge portions of said longitudinal member, said floor boards having relieved portions at the lower edges thereof for the acceptance of the edge portions of said longitudinal member, respectively.

References Cited by the Examiner
UNITED STATES PATENTS
2,812,192  11/1957  Cole _____ 296—29.2 X JOHN E. MURTAGH, Primary Examiner.
FRANK L. ABBOTT, RICHARD W. COOKE, Jr.,
Examiners.
C. G. MUELLER, Assistant Examiner.